(No Model.)
T. W. HARDING.
SPEED INDICATOR.
No. 292,808. Patented Feb. 5, 1884.
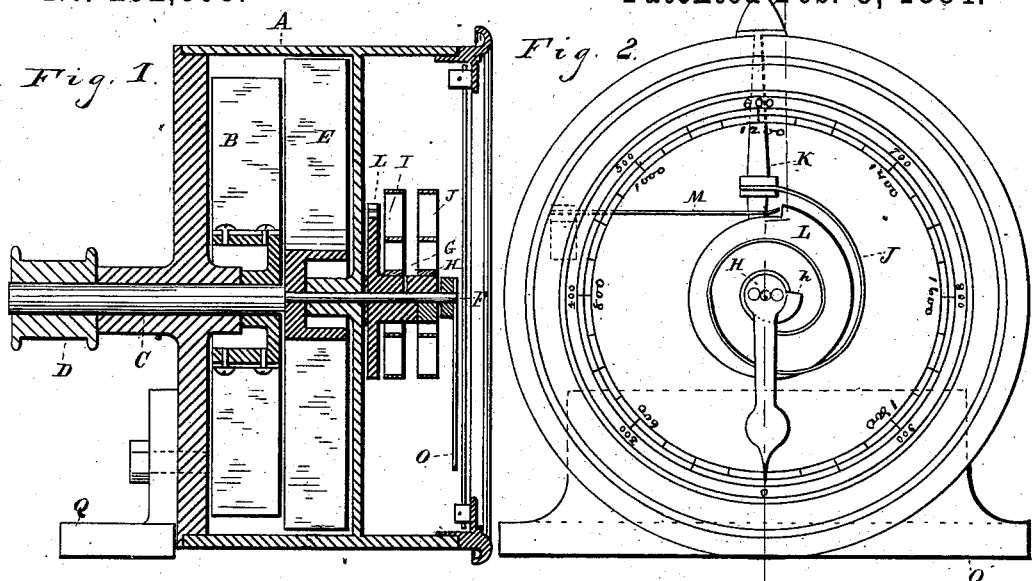
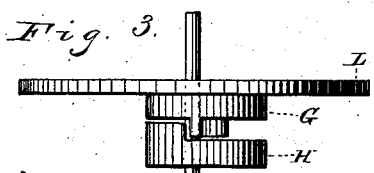
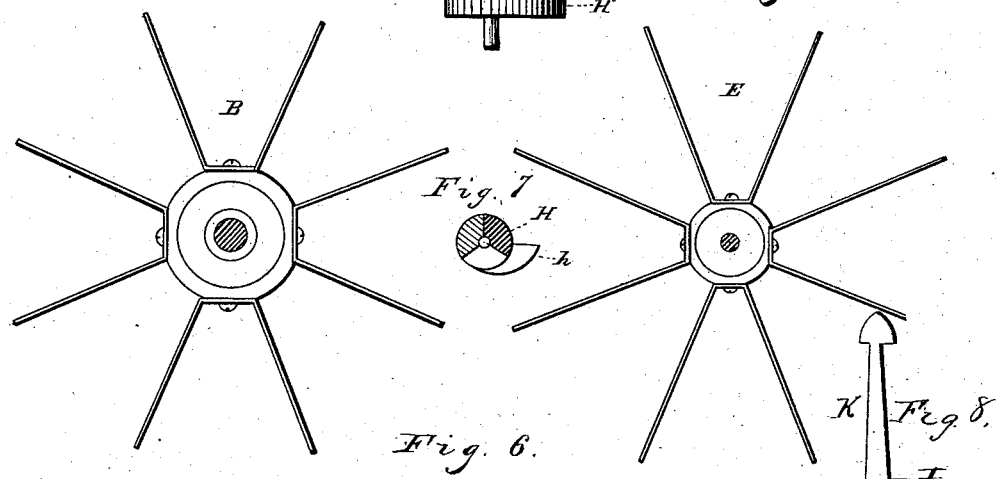
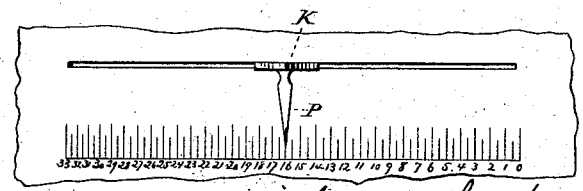
WITNESSES
INVENTOR
Thomas W. Harding
By Leggett & Leggett ATTORNEYS

UNITED STATES PATENT OFFICE.

THOMAS WALTER HARDING, OF LEEDS, COUNTY OF YORK, ENGLAND.

SPEED-INDICATOR.

SPECIFICATION forming part of Letters Patent No. 292,808, dated February 5, 1884.

Application filed December 16, 1882. (No model.)

*To all whom it may concern:*

Be it known that I, THOMAS WALTER HARDING, of Leeds, in the county of York, England, have invented certain new and useful Improvements in Speed-Indicators; and I do hereby declare the following to be a full, clear, and exact description of the invention, such as will enable others skilled in the art to which it pertains to make and use the same.

My invention relates to improvements in speed-indicators; and it consists of parts and combination of parts, more fully hereinafter described and claimed.

The object of my invention is to so improve that class of speed-indicators that are operated by air-fans that they will indicate more accurately both fast and slow speeds, and will also indicate a greater range of speeds than instruments of this class heretofore in use.

In the drawings, Figure 1 represents a vertical sectional view of a speed-indicator of the class aforesaid, showing portions of my new device, the said section being taken on the line x x of Fig. 2. Fig. 2 is a front view, and Fig. 3 is a plan view, of the same. Figs. 4, 5, 6, and 7 are drawings representing in detail different portions of my device, to which more especial reference will be had in the body of the specification; Fig. 8, a perspective view of the pointer detached, showing the connection of the springs therewith.

In Fig. 1, A represents the casing of the instrument, including a middle partition.

B and E are air-fans, other views of which are shown in Figs. 4 and 5. The driving-fan B is securely attached to the shaft C, running through the casing, and is provided at the outer end with a driving-pulley, D, or pulleys, (preferably two,) in which case the one pulley is made half the diameter of the other pulley, or may be combined in a cone-pulley. The driven fan E is placed in front of and close to, but not in contact with, the fan B, and is attached to the spindle F, extending through and beyond the partition. This spindle is designed to run as nearly frictionless as possible, and is placed with its axis in a direct line with the axis of the shaft C. To the said spindle are also attached the boss H, the cam L, and the pointer O. The boss G is also placed upon said spindle, but is left free to turn thereon. The brake-cam L is operated upon on its periphery by the friction-spring M, that is attached to the casing, and so adjusted that it will not touch the cam at its shortest radial point, but will soon engage said cam, when it is turned in the same direction that the pointer moves, pressing gently at first, but increasing its resistance as the pointer moves from its starting or zero point. The boss H is provided with a cam projecting radially, as shown at h, Fig. 7. One end of the spiral spring J, as shown in Fig. 2, is attached to the boss H, but in such position as not to engage the cam h when the pointer is at zero. By turning the boss in the direction that the pointer moves said cam and said spring are soon brought in contact, and by such contact the spring is stiffened, and the leverage by which the spring operates upon the boss is increased, so that the power of the spring in its action upon the said boss is gradually increased as the pointer advances, and as at the same time said engagement approaches the point of the cam. The other end of the spring J is attached to the lever K. Said lever may be fulcrumed to said partition, and extends out through a long slot in the case, and is provided at the outer end with a pointer, P, that passes over a scale provided on the outside of the casing adjacent to said slot. The said lever K and the said attachments are used to adjust the spring J, or other spring or springs that may be attached thereto, and the said adjustments can be made from the outside of the instrument and without opening it. The spring J, when properly adjusted, has sufficient tension to hold the pointer at zero when the instrument is at rest.

To the boss G is attached the spiral spring I, of like shape as the spring J, and is attached in the same manner, both to its respective boss and to the lever K, as seen in Fig. 8. The bosses G and H are each respectively provided with a projection extending laterally and toward each other, so that at a desired point in the movement of the boss H it will engage the boss G and cause it to turn with it. (See Fig. 3.)

The instrument is provided with a dial, on which is marked a circular scale, over which the pointer passes, as shown in Fig. 2. This scale is divided into equal parts, and is numbered from zero, in the same direction as the pointer moves, but with two series of figures, of which one series is of double the numerical value of the other. These two series of figures are made, preferably, in black and red, respectively, the two series being used, respectively, with driving-pulleys of such diameters as may be required to indicate the speed of the shaft from which the power is taken.

Q represents a flange secured to said casing, and is the base upon which the instrument rests.

The operation of my device is as follows, to wit: If a high speed is required to be indicated, power is applied from such fast-revolving body to the larger driving-pulley at D, and the higher series of figures on the dial are used; but if a slower speed is to be indicated, then the smaller driving-pulley is used and the lower series of figures are used. A rapid rotation of the driving-fan B, and the consequent movement of air, causes the driving-fan E to move also in the same direction; but the fan E and its attachments are held back in a measure by the action of the springs, as aforesaid. The equalization-point between these adverse forces, as shown by the pointer on the scale of the dial, indicates the speed of the revolving body from which power is taken.

In the operation of this class of instruments without my improvements it was found that the pointer, although operating steadily in the lower numbers of the scale, became too sensitive and vibratory as it approached the higher numbers. To obviate this difficulty I have invented the friction-brake, heretofore described, by means of which the pointer is made equally sensitive and steady while operating in any part of the said scale. It was also found with instruments without my improvements that increasing or decreasing the speed of the driving-pulley by a given number of revolutions would move the pointer a greater distance in the higher numbers, a less distance in the medium numbers, and a still less distance in the small numbers of the scale. Now, it is desirable to have the scale divided into equal spaces and have the pointer pass over equal spaces in indicating a given variation of speed in any part of the scale. I produce this desirable result by the combinations of springs, cams, brake, and adjustments heretofore described. First, the force of one spring is applied to the spindle of the pointer in opposition to the power of the fans. The force of said spring is gradually increased by the aid of its respective cam. Next, the second spring joins its force and is in turn aided by its respective cam, and, added to all this, the action of the brake tending to the same result, all combined produce a uniformity of action in the pointer in all parts of the scale.

What I claim is—

1. In a speed-indicator, the combination, with the spindle having a pointer and a cam connected therewith, of a spring or springs arranged to engage the cam and equalize the sensitiveness of the pointer in its operation, and a lever for regulating the adjustment of the spring, substantially as set forth.

2. In a speed-indicator, the combination of two cam-shaped bosses, each provided with a spiral spring, and each also provided with projections for engaging each other, and so constructed that the second boss will not move except by engagement with the first boss, and so adjusted that such engagement will not occur until the pointer has advanced some distance from the zero point and has reached a desired point on the said scale, substantially as shown and described.

3. In an air-friction speed-indicator, the combination, with a circular scale, of two series of figures, the one series of greater value than the other series, and made preferably of different colors, substantially as and for the purpose set forth.

4. In an air-friction speed-indicator, the combination, with a circular scale provided with two series of figures of different values, of two driving-pulleys whose respective diameters are to each other as the respective values of the two figures at any given point of the said scale, substantially as and for the purpose shown and described.

5. In a speed-indicator, the combination, with the spindle F, the pointer O, and the spring J, of the cam-shaped boss H, substantially as and for the purpose set forth.

6. In a speed-indicator, the combination, with the cam-shaped boss H and the attached spring J, of the cam-shaped boss G and the attached spring I, engaging each other only at a desired point, substantially as shown and described.

7. In a speed-indicator, the combination, with the spring J and the spring I, of the lever K, extending through the casing, and provided with a pointer and scale outside of the said casing for adjusting the said springs, substantially as and for the purpose shown and described.

8. In a speed-indicator, the combination, with the spindle F, the pointer O, the cam-shaped bosses H and G, and the springs I and J, of the cam L and the spring M, substantially as set forth.

In testimony whereof I sign this specification, in the presence of two witnesses, this 18th day of November, 1882.

THOMAS WALTER HARDING.

Witnesses:
C. SEDGWICK,
A. LURCOTT.